Figure 1:
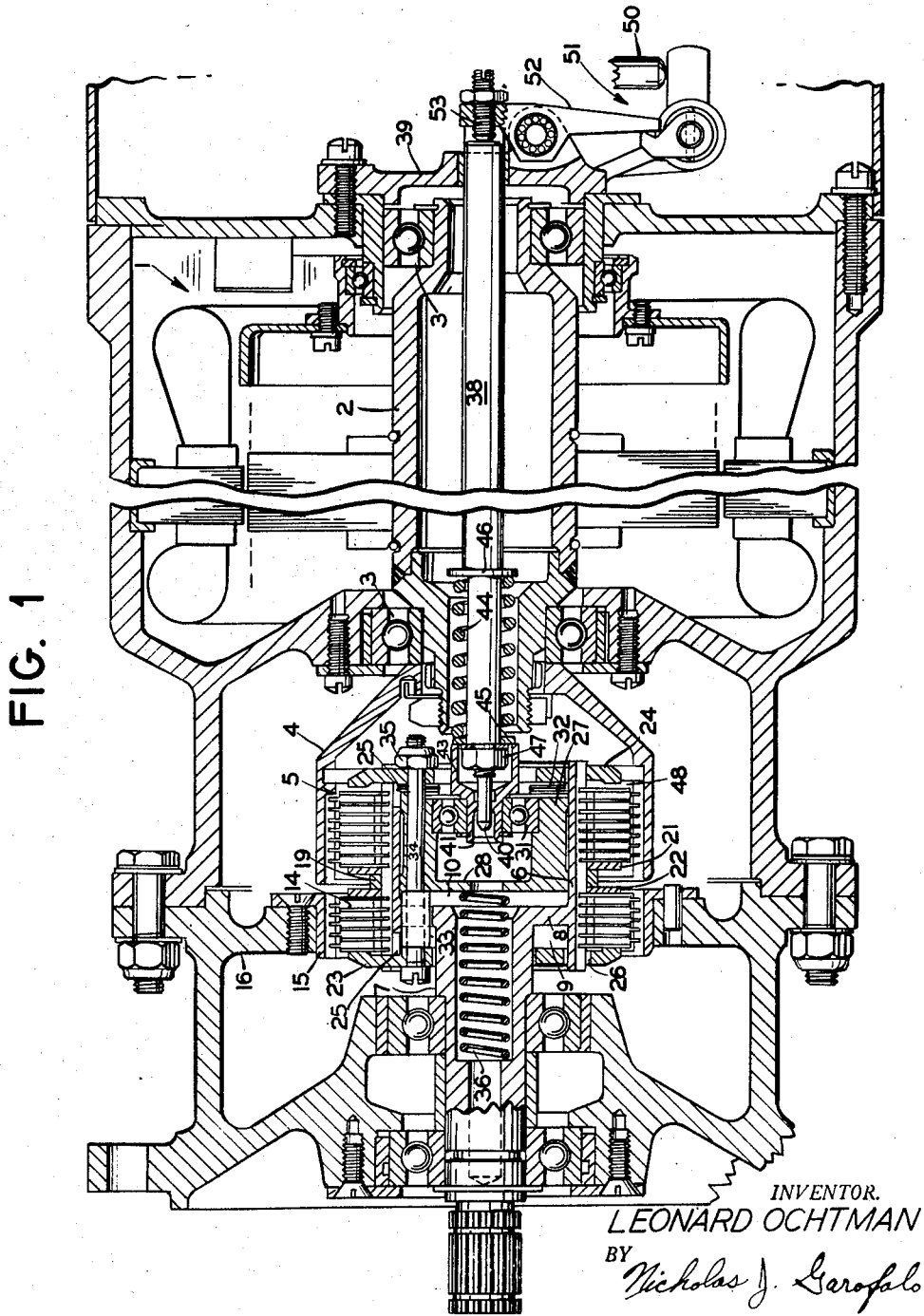

Sept. 8, 1959 　　　　　L. OCHTMAN　　　　　2,903,108
COMBINED CLUTCH AND BRAKE MECHANISM
Filed June 10, 1955　　　　　　　　　　　　2 Sheets-Sheet 1

INVENTOR.
LEONARD OCHTMAN
BY Nicholas J. Garofalo
ATTORNEY

Sept. 8, 1959  L. OCHTMAN  2,903,108
COMBINED CLUTCH AND BRAKE MECHANISM
Filed June 10, 1955  2 Sheets-Sheet 2

INVENTOR
LEONARD OCHTMAN
BY Nicholas J. Garofalo
ATTORNEY

United States Patent Office 2,903,108
Patented Sept. 8, 1959

2,903,108

COMBINED CLUTCH AND BRAKE MECHANISM

Leonard Ochtman, Ridgewood, N.J., assignor to Bendix Aviation Corporation, Teterboro, N.J., a corporation of Delaware Application June 10, 1955, Serial No. 514,512

7 Claims. (Cl. 192—18)

This invention concerns a combination clutch and brake mechanism of a multiple-disc type.

An object of the invention is to provide clutch and brake mechanism that is operable to effect release of a driving member from a driven member and at the same time to stop and hold the driven member without having to first stop the rotation of the mass of the driving member.

Another object of the invention is to provide a multiple-disc type combined brake and clutch mechanism that is operable to effect certain release of a normally braked driven member fore connecting it with a driving member.

A more particular object of the invention is to provide as a compact unit, mechanism having functions of a brake and clutch with respect to a motor and its output shaft, and to associate therewith solenoid operated means for effecting the functions thereof.

A still further object of the invention is a multiple-disc clutch and brake combination, associated with a motor drive shaft and an output shaft, and including solenoid operated means for effecting the functions thereof.

The invention further lies in its particular construction, in the arrangement of its elements, and in their particular combination and cooperative association with one another to effect the purposes intended.

The foregoing and other objects and advantages of the invention will appear more fully hereinafter from a consideration of the detailed description which follows, taken together with the accompanying drawings, wherein an embodiment of the invention is illustrated. It is to be expressly understood, however, that the drawings are for purposes of illustration and description and are not to be construed as defining the limits of the invention.

Figure 2:
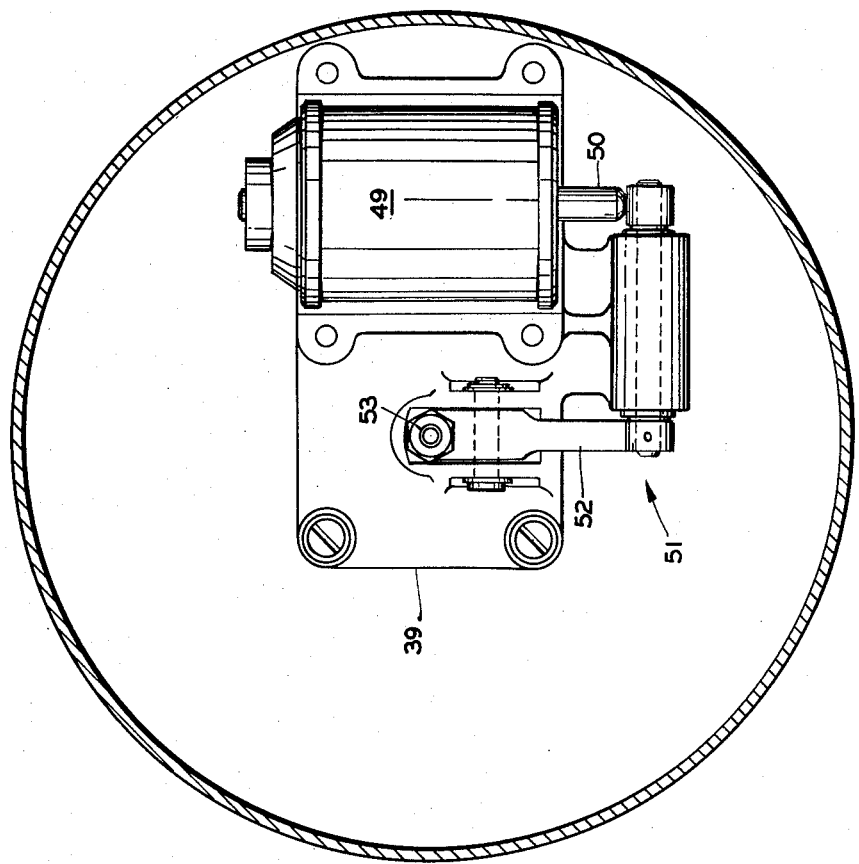

In the drawings:

Fig. 1 is a longitudinal section through a combination clutch and brake mechanism embodying the invention; and Fig. 2 is a right end view, directed to the solenoid control mechanism.

In describing the invention in further detail, reference is directed to the drawings, wherein there is shown an electric motor 1 having a hollow drive shaft 2 that is supported at its ends for rotation in bearings 3. Carried fast on the left end of shaft 2 is a clutch drive cup or barrel member 4 which is associated by a multiple interleaved disc clutch pack 5 with an elongated cylindrical hub piece 6 carried by an output shaft 7. The hub piece is hollow and opens out at both ends. Its interior diameter is relatively greater than that of the shaft proper 7. The right end of the latter extends partway into the left end of the hub piece, and a radial flange 8 at the end of the shaft proper is integral with the interior wall of the hub piece. Flang 8 partitions the interior of the hub piece, so as to provide a shallow recess 9 at the left, and a relatively deeper recess 10 at the right. The hub piece carries on its right portion disc leaves which are interleaved with disc leaves carried by the barrel member 4 to form the clutch pack 5, here called the drive shaft clutch pack.

A second multiple interleaved disc pack 14, called the brake pack, associates the hub piece 6 of the output shaft with a broad brake ring 15 that is supported fast in a paratiton wall 16 of the housing. Disc leaves carried on the interior of the brake ring are interleaved with complementary disc leaves carried on the left portion of the hub piece to form the brake pack 14. Clutch pack 5 functions to engage the motor drive shaft 2 with the output shaft 7. Brake pack 14 functions as a brake to stop and hold the output shaft against rotation, or to release it for rotation.

The brake pack 14 is located outside of the barrel member 4 and the two packs are separated from each other by a peripheral shoulder 19 formed about the hub member. Plates 21 and 22, seated against opposite faces of this shoulder, serve as backing plates for the respective packs. A pressure plate 23 serves the brake pack; a pressure plate 24 serves the drive shaft clutch pack 5. Both ends of the hub portion 6 are slotted out, as indicated at 25, and the pressure plates are provided with complementary openings 26 into which the slotted ends 25 of the hub piece extend, whereby the pressure plates are slidable on the ends of the hub to allow clamping action of these plates against their respective disc packs.

The pressure plates are arranged to slide as a unit, so that as one is moved towards its disc pack, the other is moved away from its pack. To enable this movement of the pressure plates as a unit, the latter are associated with a thrust cup 27. The latter is axially slidable in the recess 10 of the hub piece, and it is closed over at one end by a wall 28. Retained fast in the opposite open end of the cup is a bearing 31, the purpose of which will be explained later herein. The clutch pack pressure plate 24 is spaced to the right of the cup member by shims 32. The thickness of the shims may be varied to increase or decrease the spacing of the pressure plate. The brake pack pressure plate 23 is spaced to the left of the end wall 28 of the thrust cup by tubular spacing sleeves 33 which pass freely through holes in the partition flange 8 of the output shaft.

A plurality of bolts 34 passed, in order, through the brake pressure plate 23, the tubular sleeves 33, the thrust cup cylindrical wall, shims 32 and clutch pressure plate 24, and threaded into nuts 35 hold these several assembled elements together as a solid unit. This unit or thrust cup assembly may be moved axially relative to the hub member 6 to apply pressure to the brake pack when moved in one direction, and to apply pressure to the clutch pack when moved in the opposite direction. The pressure plates obviously cannot be moved to apply pressure to both packs at the same time.

A brake spring 36, pocketed at one end in the output shaft 7 and limited at the other against the end wall 28 of the thrust cup, applies thrust pressure against the latter to the right. By this arrangement, pressure plate 23 bears upon the brake pack to hold the discs thereof engaged, whereby the output shaft 7 is normally restrained against rotation; and the pressure plate 24 is held away from the clutch pack 5, whereby the motor shaft 2 is normally disengaged from the output shaft 7 and may rotate free of the latter.

A thrust rod 38 axially slidable in the hollow of drive shaft 2 is employed to move the thrust cup and pressure plates in the opposite direction in order to release the brake pack and to engage the drive shaft clutch pack. The thrust rod is slidably supported at its right end in the hub of an end plate 39 secured to the housing. It is supported for axially slidable movement at its opposite end by a reduced elongated end piece 40 thereof that is slidable in a reduced sleeve portion 41 of a bearing cup member 43. Sleeve 41 of the bearing cup is axially retained in bearing 31. The thrust rod 38 carries a coil spring 44 which is clamped between a pair of washers 45, 46. Washer 46 limits at the right against a shoulder of the rod. Washer 45 is slidable on the rod and limits at the left against a lock nut 47 threaded upon the rod up against a shoulder of the latter. The lock nut is located in the cup piece 43, but free of the wall of the latter, and the washer 45 abuts against the end wall of the cup piece. Coil spring 44 is compressed to a higher value than the force of the brake spring 36. The washer 45 is slidable to the right on the thrust rod when a sufficient pressure is exerted by the latter against the bearing cup piece 43 to overcome the preset pressure of the coil spring 44. By this arrangement when the thrust rod is forced to the left, coil spring 44 moves with the thrust rod as a solid member against the thrust cup 27, and carries the latter leftward as the force of the brake spring 36 is overcome. Leftward movement of the thrust cup removes the brake pressure plate 23 from the brake pack, and releases the discs of the latter for slipping movement relative to one another. Because of the spacing 48 normally provided by the shim elements 32 between the clutch pressure plate 24 and its pack, the brake pack is released before the clutch pressure plate 24 begins to bear upon the clutch pack 5. Further leftward movement of the thrust rod, upon application of increased pressure thereon, causes the coil spring 44 to compress further. This forces the clutch pressure plate 24 to bear upon the clutch pack 5 to exert a controlling force thereon; whereby, the output shaft is engaged for rotation together with the motor drive shaft.

It is plain that releasing the thrust rod pressure will have the opposite effect, whereby the springs 36 and 44 will be relaxed and the thrust cup will restore to normal position. In this restoration, pressure of the clutch plate 24 upon the clutch pack 5 will be relaxed to disengage the motor drive shaft for rotation free of the output shaft. This happens before the brake pressure plate is drawn to the right sufficiently to bear a restraining action on the brake pack. When the brake pressure plate 23 restores, the output shaft 7 is braked to a stop and restrained against further rotation.

A solenoid 49 (Fig. 2) energizable simultaneously with the electric motor 1 upon closing of a suitable switch, not shown, is shown here as a means that may be employed to actuate the thrust rod 33 to the left. Energization of the solenoid causes the slug 50 thereof to actuate leverage generally indicated at 51 and supported by the housing end plate 39. The leverage 51 serves to pivot a lever 52 to move an adjustable pin 53 that contacts the free end of the thrust rod, so as to cause the latter to move to the left. The leverage is arranged so as to multiply the power of the stroke of the solenoid plunger 50. The leverage is such, that upon the initial portion of the solenoid stroke, the thrust cup will be actuated sufficiently to disengage the brake pack; and upon completion of the stroke, a greater force will be transmitted through the thrust rod to compress the coil spring 44 and to effect engagement of the clutch pack 5. De-energizing the solenoid and motor causes restoration of the parts, as previously mentioned.

While an embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art; and it is my intent therefore to claim the invention not only as shown and described, but also in all such forms and modifications thereof as may be reasonably construed to be within the spirit of the invention and the scope of the appended claims.

What is claimed is:

1. In a combination brake and clutch mechanism including a driven shaft having a barrel portion and an output shaft having a hollow hub piece which extends into said barrel portion, a clutch pack having a set of discs carried by the hub piece interleaved with discs carried by the barrel member, a fixed brake ring, a brake pack having discs carried by the brake ring interleaved with a second set of discs carried by the hub piece, a brake pressure plate axially movable over one end of the hub against the brake pack, a clutch pressure plate axially movable over the opposite end of the hub against the clutch pack, a thrust member axially slidable in the hollow hub, means rigidly uniting the brake and clutch pressure plates to opposite ends of the thrust member for movement of the pressure plates with the thrust member as a unit, whereby movement of the thrust member in one direction carries the brake pressure plate against the brake pack and the clutch pressure plate away from the clutch pack, and the reverse movement of the thrust member has the opposite effect, and spring means pocketed in the hollow hub normally exerting a pressure upon the thrust member in a direction to urge the brake pressure plate into pressing engagement with the brake pack.

2. In a combination brake and clutch mechanism including a driven shaft having a barrel portion and an output shaft having a hollow hub piece which extends into said barrel portion, a clutch pack having a set of discs carried by the hub piece interleaved with discs carried by the barrel member, a fixed brake ring, a brake pack having discs carried by the brake ring interleaved with a second set of discs carried by the hub piece, a brake pressure plate axially movable over one end of the hub against the brake pack, a clutch pressure plate axially movable over the opposite end of the hub against the clutch pack, a thrust member axially slidable in the hollow hub, means rigidly uniting the brake and clutch pressure plates to opposite ends of the thrust member for movement of the pressure plates with the thrust member as a unit, whereby movement of the thrust member in one direction carries the brake pressure plate against the brake pack and the clutch pressure plate away from the clutch pack, and the reverse movement of the thrust member has the opposite effect, spring means pocketed in the hollow hub normally exerting a pressure upon the thrust member in a direction to urge the brake pressure plate into pressing engagement with the brake pack, a ball bearing fixed in an open end of the thrust member, a thrust rod having a reduced end axially slidable in the bearing and carrying shoulder means abuttable against the bearing to effect axial movement of the thrust member, and the bearing serving to permit rotation of the thrust member about the reduced end of the thrust rod.

3. In a combination brake and clutch mechanism including a driven shaft having a barrel portion and an output shaft having a hollow hub piece which extends into said barrel portion, a clutch pack having a set of discs carried by the hub piece interleaved with discs carried by the barrel member, a fixed brake ring, a brake pack having discs carried by the brake ring interleaved with a second set of discs carried by the hub piece, a brake pressure plate axially movable over one end of the hub against the brake pack, a clutch pressure plate axially movable over the opposite end of the hub against the clutch pack, a thrust member axially slidable in the hollow hub, means rigidly uniting the brake and clutch pressure plates to opposite ends of the thrust member for movement of the pressure plates with the thrust member as a unit, whereby movement of the thrust member in one direction carries the brake pressure plate against the brake pack and the clutch pressure plate away from the clutch pack, and the reverse movement of the thrust member has the opposite effect, spring means pocketed in the hollow hub normally exerting a pressure upon the thrust member in a direction to urge the brake pressure plate into pressing engagement with the brake pack, a ball bearing fixed in an open end of the thrust member, a thrust rod having a reduced end axially slidable in the bearing and carrying shoulder means abuttable against the bearing to effect axial movement of the thrust member, the bearing serving to permit rotation of the thrust member about the reduced end of the thrust rod, an electrical solenoid, and leverage means operatively associated with the solenoid for actuating the thrust rod to abut its shoulder means against the ball bearing.

4. In a combination brake and clutch device, a driving member; a driven shaft member having a hub about one end thereof of greater diameter than the shaft portion; a clutch disc pack having discs carried by the driving member interleaved with a first set of discs carried by the hub member; a brake ring in close spaced relation to the driving member; a brake disc pack having discs carried by the brake ring interleaved with a second set of discs carried by the hub member, an annular shoulder on the hub between the first and second sets of discs; a pair of backing plates seated against opposite sides of the shoulder, one backing plate abutting an end disc of the brake pack and the other abutting an end disc of the clutch pack; the hub providing a short skirted portion at one end surrounding the shaft portion of the driven member, and the hub having opposed slotted ends; a pair of pressure plates having holes to permit slidable movement of the plates over the slotted ends of the hub into contact with each disc pack; a thrust cup slidable in the hollow hub; tubular elements spacing one of the pressure plates from an end of the thrust cup; shim means spacing the other pressure plate from the opposite end of the thrust cup; bolt and nut means, passed through the pressure plates and the intermediate thrust cup, tubular elements, and shim means, holding the several latter members together as a unit; means for sliding the latter unit in one direction, and other means for sliding the unit in the opposite direction.

5. In combination, a motor driven shaft having a barrel member; an output shaft having a hollow hub; a clutch disc pack, including discs carried by said barrel member of the driven shaft interleaved with discs carried by said hollow hub of the output shaft, for engaging the driving shaft with the output shaft; a stationary brake ring, a brake disc pack, including discs carried by said stationary brake ring interleaved with discs carried by a further portion of the hub of the output shaft, for restraining rotation of the output shaft; separate pressure plates at the ends of said discs packs axially slidable into pressing contact with each disc pack; and thrust means including a cup slidable within said hub and rigidly connected to each plate for moving one pressure plate into contact with one pack and the other away from the other pack when thrust in an axial direction; and axial rods rigidly connecting each plate to said cup.

6. An actuator device for transmitting force from a driving shaft through a clutch to a driven shaft in such a manner that the driven member can be braked without braking the driving member, said device being comprised of a rotatably-mounted clutch drive cup member, an output shaft having an elongated cylindrical hub axially aligned with said cup member and having an inner part of said hub within said cup member, a clutch pack extending between said cup member and said inner part of said hub, a thrust cup having an open end slidably mounted within said inner part of said hub, said open end of said thrust cup facing the bottom of said clutch drive cup member, a clutch pressure plate rigidly attached to said thrust cup and arranged to operatively contact the inner side of said clutch pack, the outer part of said clutch pack abutting the inner side of shoulder means extending radially outwardly from said hub, a brake disc pack abutting the outer side of said shoulder means and arranged to brake said output shaft hub when compressed, a brake pressure plate rigidly attached to said thrust cup and arranged to operatively contact the outer side of said brake disc pack, said clutch pressure plate and said brake pressure plate being so rigidly attached to said thrust cup that, when said thrust cup slides in said hub, only one of said plates is operative to compress its respective pack.

7. The actuator device according to claim 6 wherein said plates are spaced from the sides of their respective packs such a distance that there is no contact by either plate for a small distance of the travel of said thrust cup and said attached plates.

References Cited in the file of this patent
UNITED STATES PATENTS

| | | |
|---|---|---|
| 1,126,848 | Parker | Feb. 2, 1915 |
| 1,865,129 | Menhall | June 28, 1932 |
| 2,418,019 | Fast | Mar. 25, 1947 |
| 2,687,789 | Nardone | Aug. 31, 1954 |